Dec. 30, 1947.  A. E. LITTLE  2,433,613
PHOTOGRAPHIC PLATEHOLDER
Filed July 13, 1946
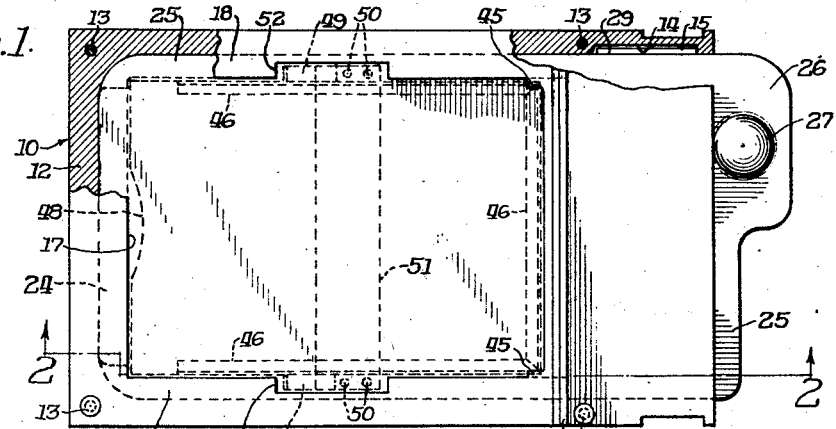
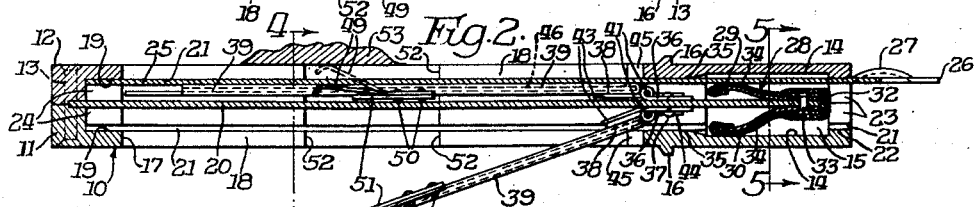
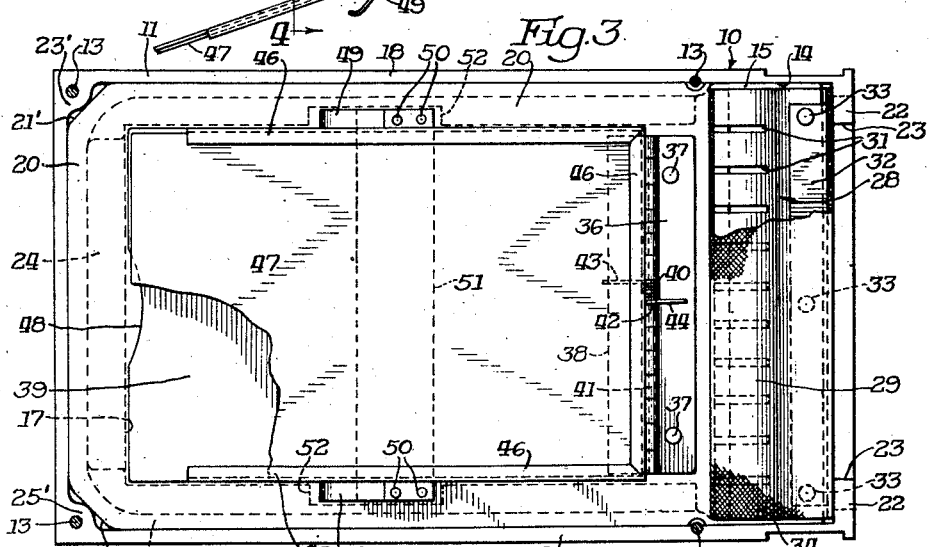
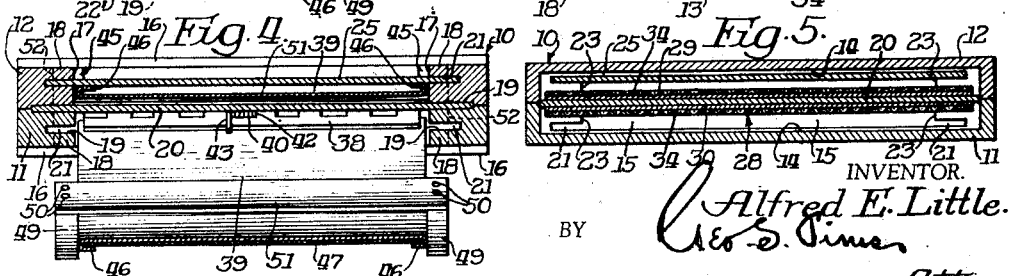
INVENTOR.
Alfred E. Little.
BY
Attys.

Patented Dec. 30, 1947

2,433,613

UNITED STATES PATENT OFFICE 2,433,613

PHOTOGRAPHIC PLATEHOLDER

Alfred E. Little, Chicago, Ill., assignor to Busch Precision Camera Corporation, Chicago, Ill., a corporation of Illinois Application July 13, 1946, Serial No. 683,352

5 Claims. (Cl. 95—66)

This invention relates to improvements in photographic plate holders and more particularly to improvements in the type of holder adapted to be loaded in darkness apart from the camera and then associated with the camera for exposure of the plate or film therein as desired.

The type of holder contemplated usually comprises a frame member divided into two separate compartments whereby opposite faces of the frame member open to said compartments. The photographic plates to be exposed in the well-known manner are placed in these compartments and then closed off from light by means of masks. In this condition the frame and the photographic plates comprise a "pack" which can be handled in light and can be prepared long in advance of intended use. This "pack" is available for making two exposures, one on each side thereof.

The type of camera with which this type of holder is used is provided with means which is capable of retaining the holder so that the photographic plate when unmasked will lie in the focal plane of the lens and hence be adapted to be exposed thereby when the shutter of the camera is actuated. Said means usually comprises a member having a ground glass viewing screen and a hood or mask movable to cover said screen, the entire member being spring-pressed against the end of the dark chamber, closing same off, and adapted to be displaced from that position by the holder when same is inserted between the spring-pressed member and the chamber end. In this position, with the holder interposed as described, the side facing the lens and chamber may be unmasked, exposed and remasked, and then the entire holder withdrawn and replaced, with the second side facing the lens. The same procedure is followed whereupon the holder may now be withdrawn, marked as desired and appropriately stowed until the film or plate is ready to be processed. Obviously, each time the holder is withdrawn, the spring-pressed member moves into position, so that the ground glass may be used for viewing.

In the usual type of plate holder it is difficult to load the film or plate into the "pack" since the sheath or device which retains the cut film or plate is of necessity below the surface of the holder. This is necessary in order to permit insertion of the light mask to cover the same. Not only is the operation of loading difficult mechanically, but the film is unnecessarily handled and the whole operation must be done in a dark room. Unloading the "pack" or holder presents a companion set of difficulties.

It is a primary object of the invention to eliminate these difficulties and to provide a novel photographic plate holder capable of being easily and quickly loaded and unloaded in a dark room.

A further object of the invention is to provide a novel and improved photographic plate or cut film holder in which the portion which contains the plate or film shall be capable of swinging to a position wherein it extends substantially outwardly from the surface of said holder, whereby said portion can be readily loaded and unloaded.

A further object of the invention is to provide a novel construction for a film or plate holder in which the film or plate retaining portions are normally disposed extending outwardly from the side of the film holder with their leading edges freely exposed but which are movable to their exposable positions within the holder by insertion of the masking members into the holder.

Still a further object of the invention is to provide a film holder in which, when same is in position on the camera, the removal of the mask for exposing the film will release means carried by the film retaining portion of said holder permitting same to engage portions of the holder to retain the said film retaining portion whereby the film carried thereby is in proper exposable position.

Further objects of the invention lie in the novel construction of the holder, in forming same from two mating members with a sandwiched member carrying the film retaining devices and light trap device and in arranging the mask to make certain portions of the device operative and inoperative.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advan-

3 tages should be readily understood and appreciated.

Referring to the drawings in which the same characters of reference are employed to indicate corresponding or similar parts throughout the several figures of the drawings:

Fig. 1 is an elevational view of a film or plate holder embodying the invention and having one mask thereof in position, portions of the device being broken away to show sectional views of certain details.

Fig. 2 is a sectional view of the device shown in Fig. 1, albeit on a slightly enlarged scale, and taken along the line 2—2 and in the direction indicated.

Fig. 3 is an elevational view of the device of Fig. 2 taken with the front half of the frame member removed and with a portion broken away to show certain details.

Fig. 4 is a sectional view taken along the line 4—4 of Fig. 2 and in the direction indicated.

Fig. 5 is a sectional view taken along the line 5—5 of Fig. 2 and in the direction indicated.

The reference character 10 designates generally a framework consisting of front and rear mating frame members 11 and 12, respectively. The members are symmetrical about their horizontal medians, as viewed in Fig. 1, and identical in shape. They are intended to mate in assembly and are held together by four screws or rivets 13 provided at appropriate positions thereabout. The frame member 11 is provided with a recess 14 which corresponds with an identical recess in the member 12 to form therewith a light-trapping chamber 15 the function of which will be presently described. The walls of the members 11 and 12 are unbroken at the position of the light-trapping chamber. Each of the members 11 and 12 is provided with a vertically arranged protuberance or ridge designated 16 for cooperating with a groove positioned on the camera (not shown) whereby when the holder is inserted as previously described it will be seated in precise position for proper exposure of the film within said holder.

It will be noted throughout this description that the designation photographic plate and film have been used interchangeably. This new invention is intended for use with either of these.

The members 11 and 12 are each formed with a substantially rectangular opening 17 whereby a framework is formed for the reception of a photographic plate or a rectangular piece of photographic film as will presently be described. Each of the members is slightly recessed about three sides of the framed opening 17 to form a slight lip 18 on the left and top and bottom edges of said members 11 and 12, and a shoulder 19 between said lips and the edges of the openings 17. When the two halves 11 and 12 are assembled together, there is formed between the shoulders a space of sufficient thickness to accommodate the partition member 20 whereby same is sandwiched between said members 11 and 12 and insulates the two recesses formed thereby in the holder frame member 10 one from the other insofar as passage of light is concerned. It will be noted that a shoulder 19 is not necessarily provided on the right side of the openings 17. It is not essential at this point because of the construction of the remainder of the device as will be described. The partition member 20 may be provided with cut-away portions at 21' and 22' to cause same to clear bosses 23' and 25' which may be formed in the members 11 and 12 to strengthen fastening points in a manner well-known in the art. The member 20 extends the entire length of the holder 10, being disposed within lip 18 on all sides thereof.

4

Each of the members 11 and 12 is provided with a narrow slot or groove 21 which is formed in the walls thereof between the outer surfaces and the inner shoulders 19. This groove opens only on the right end of each member 11 and 12, while on the other three sides it extends substantially beyond the edges of the opening 17. The lip portions 18 are broadened for strength at the right side of the frame members 11 and 12 as shown at 22 but are cut away between said broadened portions as shown at 23. This does not affect the light entering the holder from the end thereof due to the light trap as will be presently described, but serves to simplify construction. It will be noted that the slot 21 extends substantially beyond the cut-away portion 23. It will be further noted that a similar cut-away portion 24 may be formed at the left end of the holder 10 and for the same purpose, albeit still not an amount sufficient to eliminate all of the shoulder 19 at that end.

The groove 21 is adapted to accommodate a mask or slide 25 which is inserted at the right end of the slot 21 and pushed all the way to the left. The thickness of the mask 25 is such that same is firmly accommodated within the slot 21, and the length of the mask 25 is such that a substantial portion 26 protrudes from the right side of the holder 10. The portion 26 may be provided with an upset button 27 for assisting in manipulation thereof. There has been shown in Fig. 2 only one of such masks 25, the second of the grooves 21 being empty as shown.

Thus far there have been described the following portions of the photographic plate or film holder: the framework, comprising members 11 and 12; the partition member 20 sandwiched between the frame members 11 and 12; and the masks 25 which, in accordance with the above description provide spaces between the outer face of each of the members 11 and 12 and the partition member 20, said spaces being framed by edges of the openings 17. The enclosed chamber 15 is not affected to any appreciable extent by the presence of the masks 25, but this will be shortly explained.

The remaining portions of the device are all contained within the frame members 11 and 12, and, in the embodiment described, are attached directly to the partition member 20 on opposite faces thereof. It is not intended, however, that the invention be limited in that respect, since those portions to be described may exercise their assigned functions without being attached to said partition member 20.

The right edge of the member 20, as viewed in Fig. 1, is provided with a light-trapping device designated generally by the reference character 28. This device is formed from a pair of outwardly sprung elongated arms 29 and 30, horizontally slitted along their lengths as shown at 31 in order to assure the exertion of uniform pressure thereby along the entire length thereof. These arms are fastened to the right edge of the member 20 by a channel-shaped metal clip 32, riveted in place, as shown in 33, the whole device being covered with a soft, non-reflective material such as black cloth, as shown at 34.

The arms 29 and 30 are adapted to spring away from the member 20 and press against the inner surfaces of the chamber 15 as shown by the arm 30 in Fig. 2. It will be noted in Fig. 2 that the walls of the frame members 11 and 12 at the right edge of the openings 17 are of such thickness that the slot 21 coincides with the surface thereof as shown at 35. The width of the chamber 15 is greater than the distance between the walls 35 and hence if no mask 25 is present, as in the lower half of the holder 10 in Fig. 2, the arm 30 rests on the wall 14 of the chamber 15 below the slot 19 and hence prevents light which might enter the opening 23 or the right end of the slot 21 from passing beyond the light-trapping chamber 15. It will be further noted in Fig. 1, that the length of the light-trapping chamber 15 and the device 28 is greater than the width of the mask 25 and the slots 21 and hence light is thereby further prevented from passing through the ends of the slots 21 and the light-trapping chamber 15.

When the mask 25 is inserted into a slot 21 it first engages one of the arms such as 29 in Fig. 2 and moves it towards the member 20 and against its spring tension. As the slide or mask 25 is pushed home, the arm 29 rides on the inside face thereof, and when the final position is reached the disposition of the arm 29 is as shown in Fig. 2. In this manner, light is prevented from passing through the light-trapping chamber 15 by the arm 29, while the mask itself prevents light from entering by way of its slot 21.

On either side of the member 20 and intermediate the ends thereof there is attached a hinge half 36 by welding or rivets, such as 37. The swingable hinge half 38 carries attached thereto by rivets or welds a rectangular member 39 the size of which is such that same is adapted to swing out of the opening 17 as shown in Fig. 2. The coiled spring 40 is wound about the pintle 41 of the hinge halves 36 and 38 at a point 42 where the cooperating hinge loops are cut away and its arms 43 and 44 are disposed on opposite sides of the member 39 in order to cause same to normally move out of the opening 17 and away from the partition member 20, or outwardly as viewed in Fig. 2. The extent of movement of the member 39 is limited by stops 45 provided at corners of the opening 17.

Each of the members 39 is provided on three sides thereof with grooves or bent-over channels 46 whereby a photographic plate or a member of cut photographic film may be carried thereby. Such a member or plate has been designated in the drawings by the character 47. The finger recess 48 is provided to facilitate removal of the film member 47. The free end of each member 39 is not channelled but is open in order to permit ready insertion or withdrawal of the plate or film member 47.

The member 39 is provided on opposite edges thereof with spring fingers 49. These fingers extend outwardly from the member 39 as shown in Fig. 2 and may be attached thereto by rivets 50 which engage a member 51 fixed across the rear of the member 39. The upper and lower edges of the framed opening 17 are provided with recessed portions 52 for permitting passage therethrough of the spring fingers 49 when the members 39 move out of recesses as shown and described in connection with Fig. 2.

The film holder is used and operates in the following manner:

At the outset, both sides of the frame member 10 are disposed as shown in the lower half of Fig. 2. In the dark room, it is a simple matter to find the open ends of the member 39 and to insert therein the cut film members 47, said members 47 engaging within the channel edges 46. As each side is loaded with film its respective mask 25 is inserted in slot 21 and pushed home to its fullest extent. The mask 25 rides past the light-trapping device 28 in the light-trapping chamber 15 as previously described, engages upon the outer faces of channel edges 46 of the member 39 and, riding said edges commences to swing said member 39 into the opening 17. When the leading edge of the moving mask passes over the spring fingers 49, the member 39 assumes a position shown in the upper half of Fig. 2, while the spring fingers 49 are completely depressed as shown.

Presuming now that both sides of the holder 10 are loaded and the masks 25 are in place, the film or photographic plates are imprisoned completely in light-insulated chambers and the holder can be removed from the dark room and handled in ordinary light without any danger of exposing the film or plates.

When it is desired to use the film of the holder, the holder is inserted in the camera as previously described. In this position the face of the holder is directly against the rear face of the camera as indicated by the reference character 53, with the film or plate in the focal plane of the lens. As is conventional in structures of this type, the wall 53 of the camera is in the formation of a framed rectangular opening registering with the film member 39 and thereby providing along the edge of said opening means, constituting said edge or the equivalent thereof, against which said springs 49 may abut. When the photographer wishes to prepare the film for exposure he withdraws the mask 25 thereby opening the recess 17 which registers with the rear of the camera's dark chamber, so that the film 47 in the member 39 is in position for being exposed. As soon as the mask 25 is withdrawn, the spring fingers 49 move to positions shown by the broken lines in Fig. 2, in which they bear against the camera body 53 and thereby prevent the spring 40 from moving the member 39 out of position, and hence hold the film 49 at the focal plane of the lens.

When the film 47 has been exposed in any desired manner, the mask 25 is returned to the slot 21 and once more covers the member 39 with its associated film member 47, placing same in darkness. The holder can now be removed, reversed, and once more used as described.

When the film members 47 in both sides of the holder have been exposed, the holder is taken into a dark room, both slides 25 removed causing members 39 to swing outwardly so that the film members 47 can be removed for processing, the finger recesses 48 aiding in such removal.

As previously explained, the invention is adaptable for use with cut film or photographic plates. It should also be obvious that the precise type of light trap shown and designated 28 is not essential to the operation of the main features of the invention.

It is believed that this invention, its mode of construction and assembly, and many of its advantages should be readily understood from the foregoing without further description, and it should also be manifest that while a prefered embodiment of the invention has been shown and described for illustrative purposes, the structural details are nevertheless capable of wide variation within the purview of this invention as defined in the appended claims.

What it is claimed and desired to secure by Letters Patent of the United States is:

1. In a photographic film holder adapted to be associated with a camera for exposing film in said holder by the lens of said camera, means providing at least one film retaining recess within said holder, film carrying means within said recess, removable masking means adapted to enclose said carrying means within said recess and insulate said carrying means from light, said film carrying means comprising a member having film-guiding grooves and being hingedly attached within said holder, the free end of said member being adapted to swing out of said recess presenting said film-guiding grooves for facile loading and unloading thereof, said masking means being slidable into said holder from the side thereof adjacent the point of said hinged attachment between said film carrying means and the outside of the holder and being so adapted to have its leading edge engage said film carrying means upon being slid while said means is in outwardly swung position, thereby swinging same inwardly and into said recess.

2. In a film holder adapted to be engaged against a camera having a framed film opening and having a removable mask for exposing a photographic film placed therein to the lens of said camera, a film carrying member hingedly attached within said holder and having means normally swinging same out of said holder for easily loading or unloading same, said mask when in position serving to retain said film carrying member in proper position to place same in focal plane of said camera when said holder is engaged against said camera, said holder having means released upon removal of said mask for engaging against the edges of the opening of said camera to prevent movement of said holder from said proper position.

3. In a film holder adapted to be engaged against a camera and having a removable mask for exposing a photographic film placed therein to the lens of said camera, a film carrying member hingedly attached within said holder and having means normally swinging same out of said holder for easily loading or unloading same, said mask when in position serving to retain said film carrying member in proper position to place same in focal plane of said camera when said holder is engaged against said camera, said holder having spring finger means released upon removal of said mask for engaging against said camera to prevent movement of said holder from said proper position.

4. In a film holder adapted to be engaged against a camera and having a removable mask for exposing a photographic film placed therein to the lens of said camera, a film carrying member hingedly attached within said holder and having means normally swinging same out of said holder for easily loading or unloading same, said mask when in position serving to retain said film carrying member in proper position to place same in focal plane of said camera when said holder is engaged against said camera, said holder having means released upon removal of said mask for engaging against said camera to prevent movement of said holder from said proper position, and means limiting the extent of swing of said film carrying member comprising stops positioned at the corners of said recess.

5. A photographic film holder comprising a pair of identical mating members, each having a framing recess and a light-trap recess for forming a light-trapping chamber, a member sandwiched between said mating members and carrying a light-trapping device adapted to be disposed in said light-trapping chamber, film carrying devices adapted to register with said recesses, and a slot disposed in each of said members substantially the length thereof for receiving masks, said film carrying devices comprising members adapted to swing out of said recesses for facile loading and unloading thereof, said swinging members being engaged by said masks and held in light-insulated condition within said recesses when said masks are in said slots, but being urged to a swung out position when said masks are removed from said slots, said members having resilient spacing means normally rendered inoperative by said mask, said means serving to hold said members in proper spaced relation at the focal plane of the camera lens within said recesses when said holder is associated with a camera and said masks are not in masking position preparatory to photographing with said camera and comprising spring fingers adapted to move out of said recesses, and to engage against said camera to hold said swinging members in said recesses.

ALFRED E. LITTLE.

REFERENCES CITED

The following references are of record in the file of this patent:

UNITED STATES PATENTS

| Number | Name | Date |
| --- | --- | --- |
| 315,219 | Barker | Apr. 7, 1885 |
| 531,012 | Thornton | Dec. 18, 1894 |
| 1,712,854 | Thonet | May 14, 1929 |
| 1,933,823 | Nagel et al. | Nov. 7, 1933 |
| 2,268,417 | Neuschafer | Dec. 30, 1941 |
| 2,326,075 | Smith et al. | Aug. 3, 1943 |
| 2,344,951 | Smith | Mar. 28, 1944 |